Feb. 8, 1966 P. C. GOLDMARK ET AL 3,234,326

FILM RECORDING REPRODUCING APPARATUS

Filed Dec. 23, 1960 2 Sheets-Sheet 1

INVENTORS.
PETER C. GOLDMARK &
RENVILLE H. McMANN, JR.
BY Brumbaugh, Free, Graves & Donohue
their ATTORNEYS.

INVENTORS.
PETER C. GOLDMARK &
RENVILLE H. McMANN, JR.
BY
Brumbaugh, Free, Graves & Donohue
their ATTORNEYS.

3,234,326

FILM RECORDING REPRODUCING APPARATUS

Peter C. Goldmark and Renville H. McMann, Jr., Stamford, Conn., assignors to Columbia Broadcasting System, Inc., New York, N.Y., a corporation of New York

Filed Dec. 23, 1960, Ser. No. 77,916

7 Claims. (Cl. 178—6.7)

This invention relates generally to the recording on a photographic film strip and the subsequent reproduction therefrom of a "video" signal, i.e., a signal whose significant frequency components occupy a bandwidth of several megacycles. More particularly, this invention relates to the recording on such film strip of black and white or color television "video" (i.e., picture) signals with or without accompanying synchronization signals, and with or without accompanying sound.

When recording a viedo signal on photographic film it has been customary heretofore to use a flying spot scanner whose brightness is amplitude modulated by the video signal being recorded. Because of the gamma curve of the film and of the cathode ray tube scanner, the resultant grey scale after development and playback is different from and not as satisfactory as that of the original signal emerging from the television camera.

An object of this invention, accordingly, is to record on film a video signal in a manner whereby the quality of the signal reproduced from the film will not be adversely affected by the gamma curve of the film or by some other non-linear characteristics of the recording-playback system, but whereby, if desired, the recorded signal is amplitude modulated to a degree sufficient to permit editing of the film by visual inspection thereof. Another object of the invention is to record simultaneously with the video signal an audio signal whose reproduced quality will likewise not be adversely affected. Still another object of the invention is to dynamically control during reproduction the positioning relation of the information recorded on the film and the means which reads out that information so as to avoid loss of proper registration between such recorded information and such read-out means.

These and other objects are realized according to the invention in a manner as follows. Using as an example a video signal which is developed by a television camera in the course of the production of a television program, such video signal is frequency modulated in a narrow band manner on a carrier whose frequency is not much greater than the bandwidth of frequencies of the signal. The modulated carrier is employed to intensity modulate the beam of a cathode ray tube providing a high luminosity spot of small diameter. This spot is caused by sawtooth deflections of the beam of the tube to trace out transverse or "horizontal" line scans which occur between retrace intervals during which the spot is blanked out. An image of such line-scanning or flying spot is projected by suitable optical means to a film scanning zone through which a photographic film strip is being continuously moved in the longitudinal direction by an appropriate film transport mechanism. At that zone, the image of the flying spot causes the recording on the film (by exposure thereon and subsequent development thereof) of tone density variations which occur on the film in longitudinally spaced, transversely extending lines. In each such line, the recorded variations form a transverse sequence of alternating "white" and "black" tone density peaks of which the number per unit distance or "frequency" varies to provide a spatial representation of the frequency modulated carrier.

During playback the apparatus as so far described operates in the same manner as during recording excepting that the film now bears the mentioned transversely recorded lines, and excepting that the luminosity of the flying spot is maintained constant during the transverse line scanning of that spot. As the spot scans transversely, it is caused to sweep in turn over each line of information recorded on the film. The tone density variations in each such line produce variations in the light transmitted through the film from the spot. Those light variations are detected by a photomultiplier or other photoelectric means to recreate the frequency modulated character as an electrical signal. The recreated modulated carrier is then demodulated and otherwise processed to recover the original video signal in a form suitable for, say, broadcasting thereof.

As one aspect of the invention, an audio signal may be recorded and reproduced simultaneously with the video signal. If desired, the audio signal may be recorded directly on the longitudinal sound track of the film by any one of a number of conventional recording techniques as, for example, magnastripe, variable density, variable width, etc. In order, however, to minimize loss in the quality of the reproduced audio signal, it is preferable that such signal be recorded like the video signal, i.e. by frequency modulation. This may be done by frequency modulating the audio signal in, say, a wide band manner on a subcarrier, adding the modulated subcarrier to the video signal so that the combination of the modulated subcarrier and the video is modulated on the main carrier, recording and reproducing the modulated carrier in the manner heretofore described, demodulating the main carrier to recover the combined video and modulated subcarrier, separating by filter techniques the modulated subcarrier from the video, and then demodulating the subcarrier to recover the audio signal. In order to avoid loss of the audio signal during the "vertical" retrace intervals which interrupt the video signal, the main carrier continues during those intervals to be modulated by the audio-carrying subcarrier and to be recorded and reproduced. When, as described, the main carrier is modulated both by the video signal and by a subcarrier for the audio signal, the recording-reproducing system is constructed to have a highly linear signal transfer characteristic to thereby minimize crosstalk between the audio and video signals.

As another aspect of the invention, coarse and fine registration control systems may be employed to maintain proper registration between the information recorded on the film and the reproducing light spot which scans that information. Either system may be used alone although it is preferable that both be used together. When the two systems are used conjointly, the beam of the cathode ray tube is modulated during recording by (1) "horizontal" marking signals synchronized with the sawtooth deflections of the beam and occurring at the ends of the active or "scanning" interval of those deflections, (2) "vertical" marking signals which occur during the vertical retrace intervals of the television program. The "horizontal" marking signals produce conspicuous (e.g. abnormally black) tone density "pips" at the right hand ends of the lines of information recorded on the film. The "vertical" marking signals produce indications on the film of the times of occurrence of the vertical retrace intervals.

During reproduction, the coarse control system operates as follows. As the film moves longitudinally to cause the indications of the retrace intervals to be brought near or to the film scanning zone, suitable means within the described apparatus responds to those indications to generate coarse timing pulses. By comparing those pulses with original "vertical" marking signals produced in the same way during the reproduction as during recording, the timing pulses are caused through servo techniques to control the film transport mechanism so as to obtain a proper timing relationship between the successive fiields recorded on the film and the successive scanning sequences of the flying spot which corresponds to those successive fields.

The fine control system operates to assure longitudinal registration on a line by line basis between the flying spot and the information record on the film. In the fine control system, a stationary photoelectric device is located relative to the film scanning zone so that, longitudinally, the device is at or near the locus of the flying spot. Transversely the device is disposed so that the longitudinal movement of the film draws one after another of the mentioned "pips" past it. Each such pip is viewed by the device through an aperture which is substantially smaller than the longitudinal width of the recorded lines or of the spaces intervening those lines. As the film moves, the device responds to the pips successively viewed thereby to generate fine timing pulses. By comparing those fine timing pulses with original "horizontal" marking signals produced in the same way during reproduction as during recording, the fine timing pulses are caused by servo techniques to adjust the position of the flying spot to maintain it in exact longitudinal registration with each recorded line of information which is scanned thereby.

If desired, such adjustment of the flying spot may be effected mechanically or optically but, preferably, it is done electrically by slightly deflecting perpendicular to the line of scan the beam of the cathode ray tube. The advantage of such electronic adjustment is, of course, that it is nearly inertialess and, therefore, virtually instantaneous.

As an alternative to recording the fine control, horizontal "pips" at one extreme of the transverse lines of recorded information, such pips may be recorded in a separate longitudinal control track along one margin of the film. This may be done during recording by employing the original "horizontal" marking signals to flash on a fast action light source located opposite such track. Moreover, indicia derived from the mentioned "vertical" marking signals may be recorded on the film by a fast action light source in a different longitudinal viewing track than that for the "pips" or, alternatively, in the same viewing track providing that, in the latter case, the recorded "vertical" indicia have some characteristic difference from the horizontal "pips" (e.g. different longitudinal and/or transverse width) which enables the recorded indicia to be distinguished by an electro-optical system from the recorded "pips." Evidently, the described fine and coarse registration control systems and the combination thereof are usable in recording systems in which the input information signal is not necessarily recorded by frequency modulation and in which the recording medium is not necessarily a photographic film strip.

As still another aspect of the invention described herein, the recording of a television video signal on photographic film by the use of frequency modulation need not take place by exposing each line scan of the spot sequentially on a film. Instead, the beam of a cathode ray tube which provides a flying spot may be deflected both horizontally and vetrically in the familiar televison scanning pattern to display each video field of the television program on the face of the tube in the form of a frequency modulated raster. This raster may then be recorded on film by the conventional techniques employed in the television art for motion picture recording of television programs.

For a better understanding of the invention, reference is made to the following description of an exemplary embodiment thereof, and to the accompanying drawings wherein.

Figure 1:
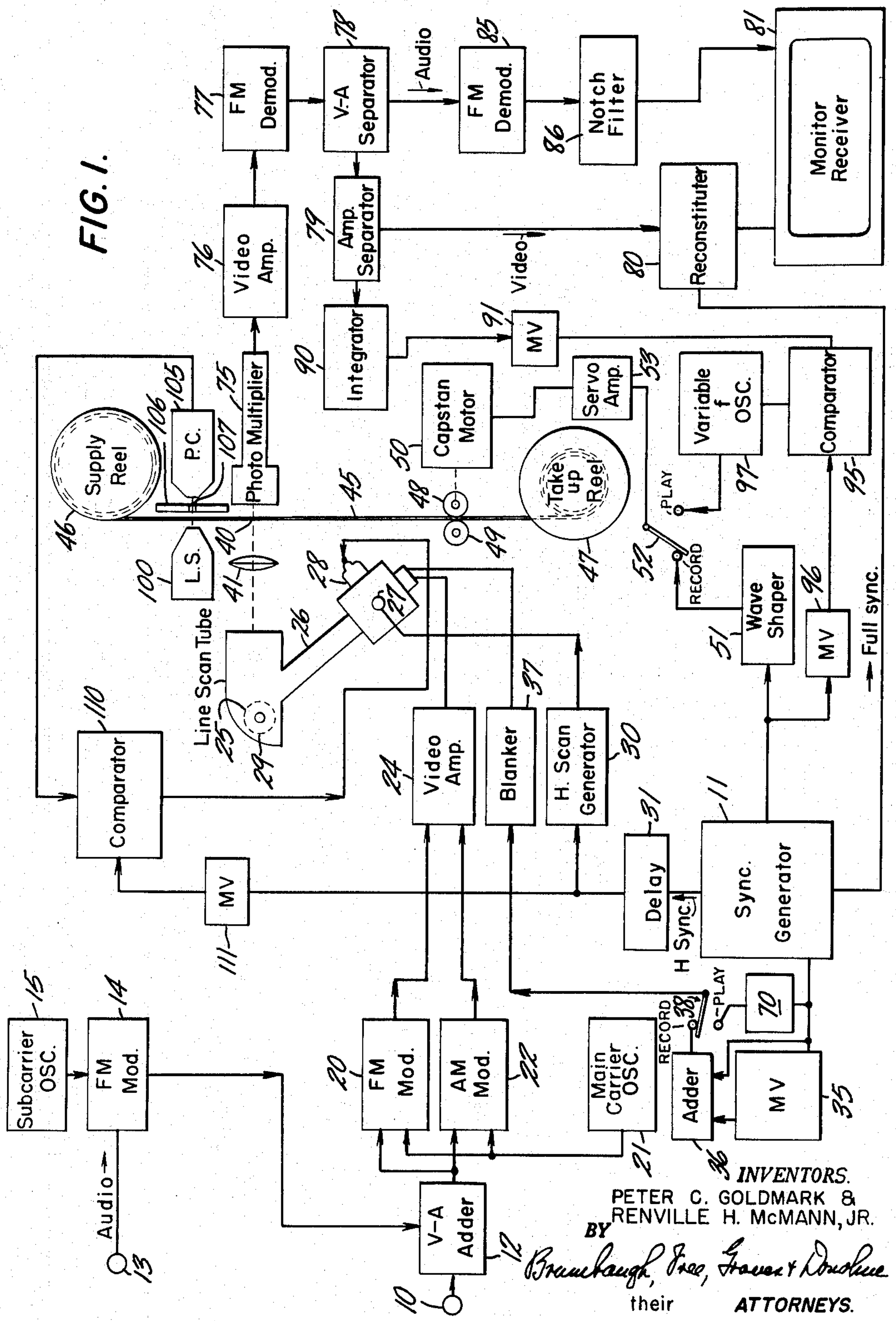
FIGURE 1 is a block diagram of the mentioned embodiment.
Figure 3:
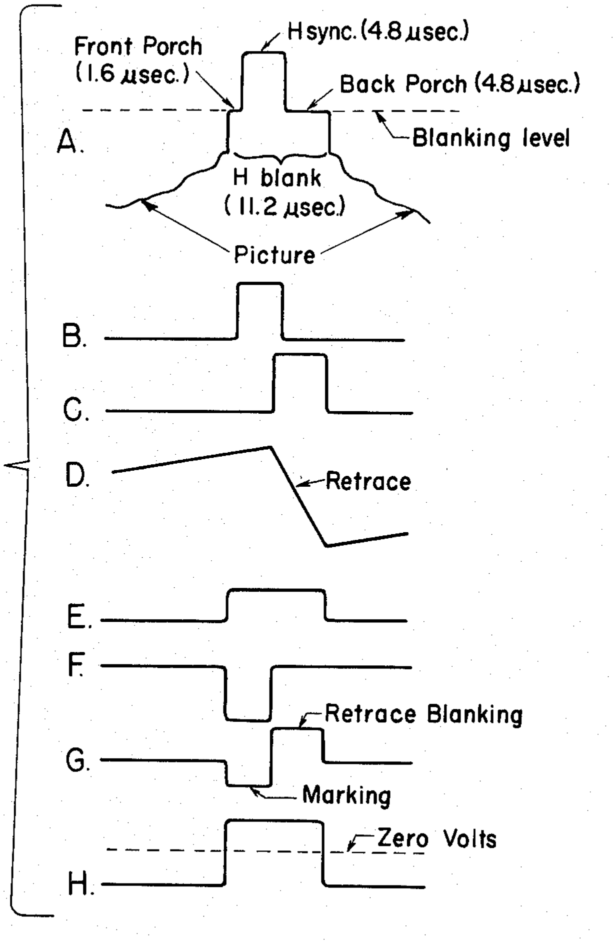
FIGURE 3 shows some of the waveforms involved in the operation of the FIGURE 1 embodiment.

Referring now to FIGURE 1, an input 10 receives from a television camera or other television program source (not shown) a composite video signal constituted of picture information together with standard synchronizing pulses produced by a synchronization generator 11 and combined with the picture information ahead of the input 10. In this composite video signal the picture information is presented at the standard 60 fields per second (30 interlaced pictures per second), at the standard horizontal line scanning frequency of 15,750 per second. FIG. 3, waveform A shows in such video signal an interval which spans the end of one horizontal line scanning period and the beginning of another.

The video signal is applied from the input 10 to a video-audio adder stage 12 which also receives an audio input developed as follows. The audio signal of the television program is applied by law of a terminal 13 to an FM modulator stage 14 which receives a constant frequency subcarrier signal of a frequency value of, say, 4.5 megacycles from an oscillator 15 or other source of such signal. In the modulator stage 14, the audio signal is frequency modulated in a wide band manner on the constant frequency subcarrier signal. Thus, the frequency modulation may be such as to cause a 15 kilocycle audio signal to produce a 75 kc. deviation of the 4.5 megacycle center frequency to thereby yield a deviation ratio of 5. The frequency modulated output of stage 14 is supplied as a modulated subcarrier to the adder stage 12 to there be combined with the previously mentioned video signal.

Assuming that the frequency value of the subcarrier signal is 4.5 megacycles, the output of adder stage 12 has a frequency bandwidth of somewhat less than 4.6 megacycles. Such output is supplied to the frequency modulator stage 20 which also receives a main carrier of a frequency value of, say, 5.0 megacycles from the oscillator 21 or other source of such signal. In stage 20, the video-audio input from stage 12 is frequency modulated on the main carrier in such a manner that the 5.0 megacycle rest frequency corresponds to the blanking level of the video, the carrier is deviated to, say, 6.8 megacycles by the video level representing peak white, and the carrier is deviated to, say, 4.3 megacycles by the video level representing the tips of the synchronization pulses. Such mode of frequency modulation is narrow band in that the highest modulating frequency of the modulating signal is represented by only one pair of side bands in the modulated signal. In other respects, the frequency modulation of the main carrier is conventional.

With the exemplary values given of 5.0 megacycles for the rest frequency and a frequency bandwidth of less than 4.6 megacycles characterizing the modulating signal, a "clearance" bandwidth of somewhat more than 0.4 megacycles exists between zero frequency and the side band of lowest frequency value in the modulated signal.

Evidently, the size of this frequency clearance will decrease as the rest frequency of the modulated carrier is decreased. Consonant with maintaining an adequate amount of such frequency "clearance," it has been found desirable in recording on film by frequency modulation to use a rest frequency which is low relative to the bandwidth of the modulating signal. The reason for this is that keeping the rest frequency low permits the recording of the maximum amount of information per unit distance on the photographic film. Thus, while the rest frequency must be greater than the bandwidth of the modulating signal, it is preferably less than twice the bandwidth of the modulating signal.

In addition to being frequency modulated on the 5.0 megacycle carrier in the stage 20, the video-audio output from stage 12 can be amplitude modulated on the same carrier in the stage 22 to thereby provide an amplitude modulation aspect to the recording on the film of the video signal as described in the co-pending application of Abraham A. Goldberg, Serial No. 92,366, filed February 28, 1961 for "Method and Apparatus for Recording Information upon Film." It is desirable that the FM recording be supplemented by some AM recording in order to facilitate the splicing of the film because the FM recording alone produces a film image which is unrecognizable as a picture. By adding, however, an amount of AM to the FM the recorded image may be visually correlated with the picture it represents. To produce this visual correlation, the AM need not be large in percentage of full modulation to the FM and, in fact, it should be low relative to the FM in order not to distort the FM image. Accordingly, it is often the case that residual amplitude modulation in the FM modulator stage 20 will be satisfactory to bring out the pictorial detail of the recorded image, and that, therefore, the separate amplitude modulation stage can be dispensed with. Of course, amplitude modulation of the recorded image can be eliminated altogether if easy visual interpretation of the recorded image is not required. One advantage in entirely eliminating amplitude modulation is that because no range of the tone scale of the film need be reserved to record the amplitude modulation variations, the whole tone scale of the film can be used at all times to record the frequency modulation variations to thereby increase the signal/noise ratio characterizing the recorded image.

The frequency modulation output from stage 20 and the amplitude modulation output from stage 22 are both supplied to a video amplifier unit 24 in which the two signals are combined to provide a carrier which is primarily frequency modulated but is moderately amplitude modulated. This frequency and amplitude modulated carrier is applied from unit 24 to the grid of a line scan tube 25 of which one model is described in an article appearing on pages 34–37 of the March 16, 1960 issue of Electronic Design.

The shown line scan tube 25 is similar to a conventional cathode ray tube in that it has the usual electron gun 26 with horizontal deflection terminals 27 and vertical deflection terminals 28 through which currents are applied to horizontal and vertical deflection coils, respectively. The tube 25 differs from a conventional cathode ray tube in the respect that the screen of tube 25 is provided by a phosphor coating on the peripheral surface of a cylindrical drum 29 mounted within the evacuated envelope of tube 25 in front of the electron gun 26 to rotate about an axis aligned with the horizontal deflection direction of the electron beam of the tube. During tube operation, the beam impinges on the phosphor coating of the rotating drum to produce a light spot which is of very small diameter (about 4 mils) but of extreme brilliance. This brilliance or high luminosity of the spot without concurrent rapid burnout of the phosphor is realized by intensely exciting the phosphor by the electron beam while simultaneously rotating the drum to continuously change the portion of the phosphor coating exposed to the beam.

The output of the video amplifier 24 when applied to the grid of the tube 25 intensity modulates the beam of that tube. The intensity modulation of the beam in turn causes the luminosity of the spot of the tube to undergo variations which correspond to the variations in instantaneous amplitude undergone by the frequency and amplitude modulated carrier impressed on the grid.

For the purpose of deflecting the electron beam of tube 25, the synchronization generator unit 11 supplies to a horizontal line scanning generator 30 through a delay unit 31 a train of horizontal synchronizing pulses which are identical with those in the composite video signal except that the pulses to unit 30 continue to be supplied at an unchanged rate to that unit during the vertical retrace intervals of the composite video signal. The delay unit 31 imparts to each input horizontal synchronizing pulse (FIG. 3, waveform B) a time delay of, say, 4.0 microseconds to place the leading edge of such pulse (FIG. 3, waveform C) at the half-time point of the duration of the corresponding horizontal blanking interval occurring in the composite video signal appearing on the input 10. In response to the horizontal synchronizing pulses which have so been delayed, the unit 30 generates a train of sawtooth current waves which are synchronized with the mentioned pulses in a manner whereby the starting times of the retrace intervals of the sawtooth waves (FIG. 3, waveform D) are coincident in time with the leading edges of the delayed horizontal synchronizing pulses. In this and in other respects, the unit 30 is the counterpart with one exception of the horizontal line scanning generator found in an ordinary television receiver. The exception is that in the unit 30 the retrace intervals of the sawtooth waves have a duration which is shorter than that of the retrace intervals of the horizontal sawtooth waves of a television receiver by an amount causing the retrace intervals of the presently described system to terminate simultaneously with the termination of the "back porch" of the corresponding horizontal blanking interval in the composite video signal.

As shown by FIGURE 1, the sawtooth wave currents which are generated by unit 30 are applied to the horizontal deflection terminals 27 of the line scan tube 25 to produce sawtooth deflections of the beam thereof. Those sawtooth deflections of the beam cause the spot of the tube to be a flying spot which undergoes a continuous succession of transverse line scans in the horizontal direction.

The luminosity of the spot of the tube 25 is intermittently modulated in amplitude as follows. The synchronizing generator 11 supplies to a one shot multivibrator 35 a train of positive going horizontal blanking pulses having the same timing as those occurring in the composite video signal on input 10 but continuing at an unchanged rate during the vertical retrace intervals of that video signal. The multivibrator 35 responds to the leading edge of each of those pulses (FIG. 3, waveform E) to generate a negative going square wave (FIG. 3, waveform F) which terminates 5.6 microseconds after the occurrence of such leading edge. Each such negative-going square wave is then combined in an adder circuit 36 with the positive-going horizontal blanking pulse from which that square wave was derived. The result of this combining action is to produce at the output of adder circuit 36 a "marking-blanking" signal (FIG. 3, waveform G) which coincides in timing and duration with the original horizontal blanking pulse, but which consists, first, of a negative going-square wave "marking pulse" of 5.6 microseconds duration and, second, of a positive going "retrace blanking" pulse which is also of 5.6 microseconds duration.

During recording, the mentioned marking-blanking signal is supplied through a two-way switch 38 thrown to "recording" position as an input to a blanking unit 37. The blanking unit applies such input without polarity inversion to the cathode of the line scan tube 25. When the input so being applied is a negative going marking pulse the voltage impressed on such cathode by blanking unit 37 increases the grid-cathode voltage of tube 25 to a level which renders the luminosity of the spot of the tube saturated at maximum intensity despite variations in the grid-cathode voltage caused by the presence on the grid of the modulated carrier. Conversely, when the input so being applied to the cathode of tube 25 is a positive going retrace blanking pulse, the voltage impressed on such cathode by the unit 37 decreases the grid-cathode to a level at which the spot of the tube remains blanked out despite the grid-cathode voltage variations caused by the presence of the modulated carrier on the grid.

During the time that the luminous spot of the tube 25 is unblanked, an image of that spot is projected from the tube to an exposure zone 40 by an optical system which is generally represented in FIGURE 1 by the lens 41. Such optical system is designed to intensify the spot image by reducing its size relative to that of the original spot. Thus, for example, at the zone 40 the image of the spot may have a diameter of about 0.8 mil as compared to the 4 mil diameter of the original spot.

The zone 40 is an exposure or film scanning zone for a photographic film strip 45 which may be a 16 mm. film, and which is shown in FIGURE 1 as being stretched longitudinally between a supply reel 46 and a take-up reel 47. During both recording and reproduction the film 45 is continuously moved from the reel 46 to the reel 47 at a speed of, say, 15" per second by a film transport mechanism of which the components shown in FIGURE 1 are a capstan 48 opposite an idler roll 49 and a two-phase synchronous motor 50 driving the capstan 48. During recording, the motor 50 is driven in synchronism with the vertical synchronizing pulses of the composite video signal on input 10 in a manner as follows. A train of those vertical synchronizing pulses is suppled from the synchronization generator 11 to a wave shaper circuit 51 which derives from those pulses a synchronous 60 cycle sine wave voltage. This sine wave voltage is supplied through a two-way switch 52 in "recording" position to a servo amplifier 53. The servo amplifier 53 translates this sine wave input thereto into power voltages which are supplied to the capstan motor 50 to produce rotation of that motor in synchronism with the vertical synchronizing pulses.

The FIGURE 1 system as so far described operates as follows to record on the film strip 45. Starting at the beginning of each horizontal line scan, represented in the composite video signal on input 10, the horizontal line scan generator 30 impresses on the horizontal deflection electrodes 27 of line scan tube 25 a sawtooth current wave which deflects the beam of that tube to produce a transverse (i.e., "horizontal") linear scanning of the luminous spot of the tube from left to right across the phosphor coating of the rotating drum of the tube. An image of the spot during each such line scan is projected by the optical system 41 to the exposure zone 40 to produce a corresponding line scan of the image of the spot transversely across the film 45. While the original spot and the spot image are so scanning, the modulated carrier impressed on the grid of tube 25 modulates the intensity of the beam of that tube to cause variations in the instantaneous amplitude of the modulated carrier to be manifested as corresponding variations in the instantaneous luminosity of the spot and of the spot image. Those luminosity variations are exposed on the film in a transverse line 55 (FIG. 2) traced out thereover by the spot image in the course of its line scan across the film. When the film is thereafter developed as a negative, each line of luminosity variations exposed thereon is translated into a line of tone density variations ranging from "white" to "black" (i.e., from a condition where the film is substantially transparent to a condition where it is substantially opaque). Because the signal applied to the grid of tube 25 is a modulated carrier which is predominately frequency modulated, each recorded line of tone density variations will have the general appearance of a sequence of alternating black and white tone density peaks or "dots" of which the number per unit distance along the sequence is a number which varies in accordance with the instantaneous frequency of the modulated carrier represented thereby. In measure, however, with the amount of amplitude modulation of the carrier which is admixed with the frequency modulation thereof, each recorded line will have susperposed on its visual pattern of alternating black and white dots a lengthwise variation in grey shading which is representative of the pictorial content of the portion of the video signal of which such line is the record.

Because of the described 4.0 microsecond delay in the horizontal synchronizing pulses applied to the horizontal line scan generator 30 in each horizontal deflection of the spot image, that image will scan across the film for 5.6 microseconds after the picture information in the composite video signal has been terminated by the horizontal blanking pulse occurring at the end of the horizontal line scanning (compare waveforms A and D of FIG. 3). In this extra 5.6 microseconds of scanning of the spot image, the described 5.6 microsecond marking pulse (FIG. 3, waveform G) is applied to the cathode of tube 25 to render its spot saturated at maximum luminosity. Hence, at the right-hand end of each transversely recorded line of tone density variation, the pattern of alternating white and black dots is replaced for a short space out to the right-hand margin of the line by a solid black, bar-like indicium or "pip" 56. The purpose of this pip will be later described.

At the end of the recording of the mentioned indicium, the spot retraces in 5.6 microseconds (FIG. 3, waveform D) to its starting point for a new scan. During this retrace interval, the spot is completely blanked by the described retraced blanking pulse (FIG. 3, waveform G). Because of the shorter than normal 5.6 microsecond duration of the retrace interval, the spot initiates its new scan in time coincidence with the next start of picture information in the composite video signal (compare waveforms A and D of FIG. 3). Thus, the tube 25 operates so that the tube spot continues for marking purposes to scan 5.6 microseconds after the end in the composite video signal of the picture information produced during a given horizontal line scan period, but so that, nonetheless, the spot starts its next line scan simultaneously with the start of the picture information in the next horizontal line scan period of the composite video signal.

Figure 2:
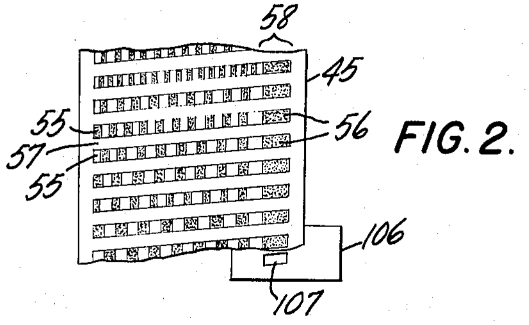
FIGURE 2 is a diagram showing on an exaggerated scale the information recorded on a section of film strip by the FIGURE 1 embodiment and showing also the relation between that film strip and certain of the optical features of the embodiment.

While the spot image is scanning transversely, the film is being moved longitudinally through the exposure zone 40 by the capstan 48. This longitudinal movement of the film serves to space longitudinally the transverse lines of information recorded on the film during the successive line scans of the spot. Preferably, the space 57 between each adjacent pair of recorded lines should be at least 0.8 mil, i.e. equal to the longitudinal thickness of the lines. As shown by FIG. 2, in the succession of lines which are so recorded, the black pips 56 at the right-hand ends of those lines are in transverse registration to form, in effect, a longitudinal control path or track 58 whose purpose will be later described.

Each full field of the composite video signal is recorded on the film 45 in the manner described. In the vertical retrace interval of that signal, the delayed horizontal synchronizing pulses (FIG. 3, waveform C) are fed without interruption to the horizontal line scan generator 30. Accordingly, the transverse line scans of the spot of tube 25 continue to take place in those intervals.

During the vertical retrace intervals, the carrier continues to carry the sound information. It follows that the sound is recorded without interruption excepting during the intervals of 11.2 microseconds during which the marking-blanking signals (FIG. 3, waveform G) are applied to the spot. The marking portions of those last-named signals are recorded without interruption as pips 56 (FIG. 2) in the vertical retrace intervals. Further each vertical synchronizing pulse occurring in the composite video signal is frequency modulated on the carrier to be recorded on the film by the transverse record lines created during the corresponding vertical retrace interval. Those recorded vertical synchronizing pulses are employed as later described.

We come now to a consideration of the manner in which the FIGURE 1 system reproduces the recorded information. During playback, the synchronization generator 11 and the horizontal lines scan generator 30 operate as before to produce transverse line scans of the flying spot of tube 25. For playback, however, the luminosity of the spot is not modulated (as it is during recording) first by a modulated carrier signal on the grid of tube 25 and then by a marking-blanking signal impressed on the cathode of that tube. Instead, there is no dynamic signal on the grid and, on the cathode, the marking-blanking signals are replaced by conventional horizontal blanking signals (FIG. 3, waveform E) derived from unit 11 and applied to tube 25 by throwing of the switch 38 to "playback" position. As shown (FIG. 3, waveform H), those horizontal blanking signals may be both adjusted in D.C. level and amplified in an amplifier 70 to produce a signal which is positive during the horizontal blanking intervals themselves, and which is negative during the period intervening those intervals. When applied to the cathode of tube 25, the effect of this signal is to produce a flying spot which is of constant luminosity for each transverse scan (except for the last 5.6 microseconds thereof) and which is blanked out for the rest of the time.

While the constant luminosity spot is so scanning, the capstan 48 is longitudinally moving the film 45 as before through the exposure zone 40. Thus, assuming proper longitudinal registration of each recorded line on the film with the image of the spot during one transverse scan thereof as the spot image in the course of that scan sweeps from left to right across the line, the variations representing the recorded modulated carrier cause corresponding variations in the light transmitted from the spot through the film. Those light variations are detected by a photomultiplier tube 75 to reproduce at the output thereof the original modulated carrier. This recreated modulated carrier is passed through a video amplifier 76 to an FM demodulator stage 77 which recovers the original modulating signal, namely, the combination of the composite video signal and the modulated audio subcarrier.

The output of the demodulator stage 77 is applied to a video-audio separator circuit which employs filters to separate on a frequency basis the 4.5 megacycle frequency modulated audio subcarrier from the composite video signal of 0–4.2 megacycle bandwidth. The separated video signal is next passed through an amplitude separator circuit 79 which acts upon the video signal to separate the picture information from the various synchronizing pulses. The picture information signal from the circuit 79 is combined in a reconstituter circuit 80 with a fresh set of standard synchronizing pulses supplied from the synchronizer generator 11. Thereafter, the composite video signal as so reconstituted is supplied to a utilization device as, say, the television monitor unit 81 shown in FIGURE 1.

The 4.5 megacycle frequency modulated audio subcarrier is fed to a demodulator stage 85 which recovers and recreates the original audio frequency signal applied during recording to the input 13 of the system. Such recreated audio signal is passed through a notch filter 86 which eliminates any 15,750 c.p.s. component which may be present in the reproduced audio signal as a result of the short interruption in the recording thereof during each application of the described marking-blanking signal to the tube 25. After being so filtered, the audio signal is applied directly to the audio frequency section of the TV monitor 81 or other utilization device.

In order to control the motion of the film during playback in a "coarse" manner, the synchronizing signals separated by circuit 79 are supplied to an integrator circuit 90 which is similar to the circuits of like name in conventional television receivers. This circuit 90 selectively responds to the vertical synchronizing pulses fed thereto to produce from each thereof a trigger signal. The train of trigger signals so developed are used to drive a one shot multivibrator 91 to produce a train of square waves which are synchronized in timing with the described vertical synchronizing pulses, but which have a duty cycle of 50% as contrasted to the duty cycle of about 10% characterizing the last-named pulses.

The square waves from multivibrator 91 are applied as one input to a comparator circuit 95 for which another input is provided by square waves of similar duration produced by the driving of a one-shot multivibrator 96 by the same vertical synchronizing pulses (from synchronizing generator 11) which were used, (as described) during recording to actuate the capstan motor 50. The circuit 95 compares the timing of the two square wave inputs thereto to develop an error signal of which the polarity and magnitude reflect, respectively, the sense and the amount of the difference in timing between the square wave input from multivibrator 91 and the square wave input from multivibrator 96. Such error signal is applied to a variable frequency oscillator 97 of which the output signal can be pulled by the error signal a few cycles to either side of a nominal frequency of 60 cycles per second. During reproduction, the switch 52 is thrown to "playback" position to apply this output signal to the servo amplifier 53. The servo amplifier 53 operates in a conventional manner to adjust the speed of capstan motor 50 up or down as required to tend to reduce to and maintain at zero magnitude the value of the error signal from comparator circuit 95. By so doing, the longitudinal speed during playback of the film 45 is controlled to maintain approximately equal the rate at which the flying spot scans transversely and the rate at which the recorded lines on the film 45 pass through the film scanning zone 40.

Having obtained rate equalization in the manner described, it is further desirable that the instantaneous relative positioning or "space phase" of the flying spot and of the moving film be such as to produce longitudinal registration of the spot in each of its transverse scans with the recorded line of information then being presented for scanning. To this end, a light source 100 is disposed on one side of the moving film 45 to scan with a continuous light beam only that transverse portion of the film on which appear the black indicia or pips 56 (FIG. 2) produced during recording by the described horizontal marking pulses. As stated, each recorded line of information 55 is terminated by one of such indicia, and the collection of those indicia 56 lie in a longitudinal path or "track" 58 in which those indicia alternate with the spaces 57 by which the recorded lines are separated. For convenience of illustration, the light source 100 is shown as longitudinally displaced from the exposure zone 40 at which the film is scanned by the flying spot. In practice, however, the light source 100 may be placed so that the beam of light therefrom is longitudinally located either directly at that zone 40 or as close thereto as mechanical considerations will permit.

The light source 100 forms part of an optical scanning system of which other components are (1) a photocell 105 disposed opposite to and on the other side of the film 45 from the unit 100, and (2) an aperture plate 106 interposed between photocell 105 and film 45, the plate 106 having formed therein an aperture 107 which limits the effective field of view of the scanning system to the cross sectional area of the aperture. This aperture 107 is shaped to have a size in the longitudinal direction which is less than the longitudinal width of either the considered indicia 56 or of the spaces 57 intervening those indicia. Thus, if the recorded lines of information 55 and the inter-line spaces 57 each have a longitudinal width of 0.8 mil. (so that the indicia 56 at the ends of those lines and the spaces 57 separating such indicia likewise have a value of 0.8 mil.), the longitudinal size of the aperture 107 may be of the order of 0.3. In the transverse direction, the aperture 107 may be coextensive with or slightly less in size than the transverse extent on the film of the mentioned indicia.

As the film 45 moves during playback, the longitudinal pattern of alternating indicia 56 and inter-line spaces 57 passes in front of the beam from light source 100 to produce variations in the intensity of the light transmitted from the beam through the film 45 and through the aperture 107. Those intensity variations are detected by the photocell 105 to produce as an output therefrom a train of square waves which is supplied as one input to a comparator circuit 110. Another simultaneous input for such comparator circuit is provided by a train of similar duration square waves produced by a one shot multivibrator 111 which is driven by the leading edges of those delayed horizontal synchronizing pulses which have previously been described as being produced during recording at the output of delay unit 31, and which are also generated at the output of that unit during playback. The comparator circuit 110 operates like the comparator circuit 95 to compare the timing of the two square wave inputs thereto so as to develop an error signal whose polarity and magnitude reflect, respectively, the sense and the amount of the departure in timing of the square wave pulses from photocell 105 relative to the square wave pulses from multivibrator 111.

This last-named error signal is employed to adjust up or down as required the longitudinal or "vertical" position of the image of the flying spot so as to bring that image in exact longitudinal registration with the recorded line on the film then being presented for scanning. If desired, the adjustment of the flying spot image may be realized by utilizing the error signal to energize a conventional servo system of which the servo motor effects either a slight adjustment in position of the entire line scan tube 25 or a slight adjustment of the optical system represented by lens 41. More conveniently, however, the last-named error signal is directly connected to the vertical deflection electrodes 28 of the line scan tube 25 to thereby adjust in a purely electronic manner the longitudinal position of the flying spot produced thereby. While the error signal voltage when applied to those vertical deflection electrodes 28 will cause the point of impingement of the beam of the tube 25 with the rotating drum 29 thereof to move over an arc (because the drum provides a cylindrical rather than a planar phosphor screen), the full range of longitudinal adjustment of the flying spot corresponds to a length of arc which is so small that the curvature of this arc length either is negligible or can easily be compensated for.

The above described embodiment being exemplary only, it will be understood that the invention hereof comprehends embodiments differing in form and/or detail from that specifically disclosed. For example, the multivibrators 91 and 96 can be omitted and the signals from the integrator circuit 90 and the synchronizing signal generator 11 can be compared directly. Other modifications will be apparent to those skilled in the art. Accordingly, the invention is not to be considered as limited save as is consonant with the scope of the following claims.

We claim:

1. Apparatus to record a video signal comprising means to frequency modulate said signal on a carrier, a cathode ray tube of which the beam is intensity modulated by said modulated carrier, means to impart sawtooth deflections to said beam to produce transverse line scans across the screen of said tube of a light spot whose luminosity is modulated like the intensity of said beam, means to blank out said spot during the retrace intervals of said sawtooth deflections, optical means to project an image of the line scans of said spot to an exposure zone, and a film transport mechanism to move a photographic film strip continuously through said zone so as to have the luminous variations of said spot during said line scans recorded on said strip as tone density variations in longitudinally spaced lines extending transversely across the film strip.

2. Apparatus to record a video signal comprising, a source of a carrier of a frequency less than twice the bandwidth of said signal, means to frequency modulate said signal on said carrier, a cathode ray tube of which the beam is intensity modulated by said modulated carrier means to impart sawtooth deflections to said beam to produce transverse line scans across the screen of said tube of a light spot whose luminosity is modulated like the intensity of said beam, means to blank out said spot during the retrace intervals of said sawtooth deflections, optical means to project an image of the line scans of said spot to an exposure zone, and a film transport mechanism to move a photographic film strip continuously through said zone so as to have the luminous variations of said spot during said line scans recorded on said strip as tone density variations in longitudinally spaced lines extending transversely across the film strip.

3. Apparatus to record a video signal comprising, means to frequency modulate said signal on a carrier, a cathode ray tube of which the screen is provided by a phosphor surfaced operatively rotating drum within the tube envelope, and of which the beam is intensity modulated by said modulated carrier to produce on the phosphor surface of said drum an intense light spot manifesting the variations in the instantaneous amplitude of said carrier as variations in the instaneous luminosity thereof, means to impart sawtooth deflections to said beam in the direction of the axis of said drum to produce transverse line scans of said spot across said phosphor surface, means to blank out said spot during the retrace intervals of said sawtooth deflections, optical means to project an image of the line scans of said spot to an exposure zone, and a film transport mechanism to move a photographic film strip continuously through said zone so as to have the luminous variations of said spot during said line scans recorded on said strip as tone density variation in longitudinally spaced lines extending transversely across the film strip.

4. Apparatus to record a video signal comprising, a source of a carrier of a frequency value less than twice that of the bandwidth of said signal, means to frequency modulate said signal on said carrier, a cathode ray tube of which the screen is provided by a phosphor-surfaced, operatively rotating drum within the tube envelope, and of which the beam is intensity modulated by said carrier to produce on the phosphor surface of said drum an intense light spot manifesting the variations in the instantaneous amplitude of said carrier as variations in the instantaneous luminosity thereof, means to impart sawtooth deflections to said beam in the direction of the axis of said drum to produce transverse line scans of said spot across said phosphor surface, means to blank out said spot during the retrace intervals of said sawtooth deflections, optical means to project an image of the line scans of said spot to an exposure zone, and a film transport mechanism to move a photographic film strip continuously through said zone so as to have the luminous variations of said spot during said line scans recorded on said strip as tone density variations in longitudinally spaced lines extending transversely across the film strip.

5. Apparatus to record the audio and video signals from a television program source comprising, means to frequency modulate said audio signal on a subcarrier, means to combine said modulated subcarrier and video signals, means to frequency modulate said combined video signal and modulated subcarrier on a carrier, a cathode ray tube of which the beam is intensity modulated by said modulated carrier, means to impart sawtooth deflections to said beam to produce transverse line scans across the screen of said tube of a light spot whose luminosity is modulated like the intensity of said beam, means to blank out said spot during the retrace intervals of said sawtooth deflections, optical means to project an image of the line scans of said spot to an exposure zone, and a film transport mechanism to move a photographic film strip continuously through said zone so as to have the luminous variations of said spot during said line scans recorded on said strip as tone density variations in longitudinally spaced lines extending transversely across the film strip.

6. Apparatus to record audio and video signals derived from a television program source comprising, means to modulate said audio signal on a subcarrier, means to combine said modulated subcarrier with said video signal, means to modulate said combined modulated subcarrier and video signal on a carrier, a cathode ray tube of which the beam is intensity modulated by said modulated carrier, means responsive to a train of uninterrupted horizontal synchronization pulses from said source to impart to said beam sawtooth deflections which are synchronized with said pulses and which produce transverse line scans across the screen of said tube of a flying light spot manifesting the variations in the instantaneous amplitude of the modulated carrier as variations in the instantaneous luminosity thereof, means responsive to an uninterrupted series of horizontal blanking pulses from said source to blank out said spot only during the durations of said last named pulses to thereby render the recording of said audio signal uninterrupted by the vertical retrace intervals which interrupt said video signal, optical means to project an image of the line scans of said spot to an exposure zone, and a film transport mechanism to move a photographic film strip continuously through said zone so as to have the luminous variations of said spot during said line scans recorded on said strip as tone density variations in longitudinally spaced lines extending transversely across the film strip.

7. Apparatus to record and reproduce a video signal comprising, means to frequency modulate said video signal on a carrier, a cathode ray tube, means selectively operable during recording to render the beam of said tube intensity modulated by said modulated carrier and during reproduction to have the intensity of said beam unmodulated, means synchronized by horizontal deflection pulses from said source both during recording and reproduction to impart sawtooth deflections to said beam so as to produce transverse line scans across the screen of said tube of a flying light spot whose luminosity is modulated during recording like the intensity of said beam, means to blank out said spot during the retrace intervals of said sawtooth deflections, optical means to project an image of the line scans of said spot to an exposure zone, a film transport mechanism to move a photographic film strip through said zone both during recording and reproduction so as, during recording, to have the luminous variations of said spot recorded in longitudinally spaced lines extending transversely across the strip, and so as, during reproduction to have said lines transversely scanned seriatim by said spot, and photoelectric means operable during reproduction to detect variations caused by said tone density variations in the transmission through said film of light from the spot then being produced by said unmodulated beam.

References Cited by the Examiner

UNITED STATES PATENTS

| | | | |
|---|---|---|---|
| 2,301,374 | 11/1942 | Cox | 178—7.2 |
| 2,525,891 | 10/1950 | Garman et al. | 178—6.7 |
| 2,628,277 | 2/1953 | Roe | 178—69.5 |
| 2,720,554 | 10/1955 | Harshbarger | 178—7.2 |
| 2,736,761 | 2/1956 | Sziklai | 178—6.7 |
| 2,810,782 | 10/1957 | Hester | 178—5.6 |
| 2,851,521 | 9/1958 | Clapp | 178—7.2 |
| 2,890,277 | 6/1959 | Duke | 178—7.2 |
| 2,901,538 | 8/1959 | Artzt | 178—6.7 |
| 2,952,737 | 9/1960 | Friess | 178—5.6 |
| 3,017,462 | 1/1962 | Clark | 178—69.5 |

OTHER REFERENCES

Publication: "Television Signal Recording," by W. Woods-Hill Wireless World, March 1956; pp. 127–130.

DAVID G. REDINBAUGH, *Primary Examiner.*

NEWTON N. LOVEWELL, *Examiner.*